(12) United States Patent
Wu

(10) Patent No.: US 10,660,142 B2
(45) Date of Patent: May 19, 2020

(54) DEVICE AND METHOD OF HANDLING A RADIO RESOURCE CONTROL CONNECTION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/125,795

(22) Filed: Sep. 10, 2018

(65) Prior Publication Data

US 2019/0082480 A1 Mar. 14, 2019

Related U.S. Application Data

(60) Provisional application No. 62/556,500, filed on Sep. 10, 2017.

(51) Int. Cl.
| | | |
|---|---|---|
| *H04W 76/10* | (2018.01) | |
| *H04W 48/20* | (2009.01) | |
| *H04W 48/10* | (2009.01) | |
| *H04W 76/30* | (2018.01) | |
| *H04W 76/34* | (2018.01) | |
| H04W 76/27 | (2018.01) | |
| H04W 88/08 | (2009.01) | |
| H04W 88/02 | (2009.01) | |

(52) U.S. Cl.
CPC ........... *H04W 76/10* (2018.02); *H04W 48/10* (2013.01); *H04W 48/20* (2013.01); *H04W 76/30* (2018.02); *H04W 76/34* (2018.02); H04W 76/27 (2018.02); H04W 88/02 (2013.01); H04W 88/08 (2013.01)

(58) Field of Classification Search
CPC ..... H04W 48/10; H04W 48/20; H04W 76/10; H04W 76/30; H04W 76/36; H04W 88/02; H04W 88/08
See application file for complete search history.

(56) References Cited

U.S. PATENT DOCUMENTS

| | | | |
|---|---|---|---|
| 2014/0226615 A1* | 8/2014 | Beale | H04W 28/20 370/329 |
| 2015/0043533 A1 | 2/2015 | Kim | |
| 2018/0139778 A1 | 5/2018 | Chou | |

FOREIGN PATENT DOCUMENTS

WO 2016/048114 A1 3/2016

OTHER PUBLICATIONS

Search Report dated Oct. 24, 2018 for EP application No. 18193395.3, pp. 1-6.

(Continued)

*Primary Examiner* — Pao Sinkantarakorn

(74) *Attorney, Agent, or Firm* — Winston Hsu

(57) ABSTRACT

A communication device for handling a radio resource control (RRC) connection comprises at least one storage device and at least one processing circuit coupled to the at least one storage device. The at least one storage device stores, and the at least one processing circuit is configured to execute instructions of: communicating with a base station (BS) in a first bandwidth part (BWP) at a first carrier; receiving a RRC Connection Release message from the BS, wherein the RRC Connection Release message configures the communication device to enter an IDLE state or an INACTIVE state; and camping on a second BWP at the first carrier.

5 Claims, 6 Drawing Sheets

(56) References Cited

OTHER PUBLICATIONS

Nokia, Nokia Shanghai Bell, "On the remaining wider-band aspects of NR", 3GPP TSG-RAN WG1 Meeting #90, R1-1714094, Aug. 21st-25th, 2017, Prague, Czech Republic, XP051316884, pp. 1-7.
Qualcomm Incorporated, "Remaining control plane issues of BWP", 3GPP TSG-RAN WG2 Meeting #100, R2-1713885, Nov. 27th-Dec. 1st, 2017, Reno, USA, XP051372521, pp. 1-7.

\* cited by examiner

DEVICE AND METHOD OF HANDLING A RADIO RESOURCE CONTROL CONNECTION

CROSS REFERENCE TO RELATED APPLICATIONS

This application claims the benefit of U.S. Provisional Application No. 62/556,500 filed on Sep. 10, 2017, which is incorporated herein by reference.

BACKGROUND OF THE INVENTION

1. Field of the Invention

The present invention relates to a device and a method used in a wireless communication system, and more particularly, to a device and a method of handling a radio resource control connection.

2. Description of the Prior Art

A new radio (NR) system, initiated by the third generation partnership project (3GPP), is regarded as a new radio interface and a radio network architecture that provides a high data rate, low latency, packet optimization, and improved system capacity and coverage area. In the NR system, a radio access network (RAN) includes a plurality of NR base stations (BSs) (called gNBs), and communicates with a plurality of mobile stations (called user equipments (UEs)).

SUMMARY OF THE INVENTION

The present invention therefore provides a method and related communication device for handling a radio resource control (RRC) connection to solve the abovementioned problem.

A communication device for handling a radio resource control (RRC) connection comprises at least one storage device and at least one processing circuit coupled to the at least one storage device. The at least one storage device stores, and the at least one processing circuit is configured to execute instructions of: communicating with a base station (BS) in a first bandwidth part (BWP) at a first carrier; receiving a RRC Connection Release message from the BS, wherein the RRC Connection Release message configures the communication device to enter an IDLE state or an INACTIVE state; and camping on a second BWP at the first carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
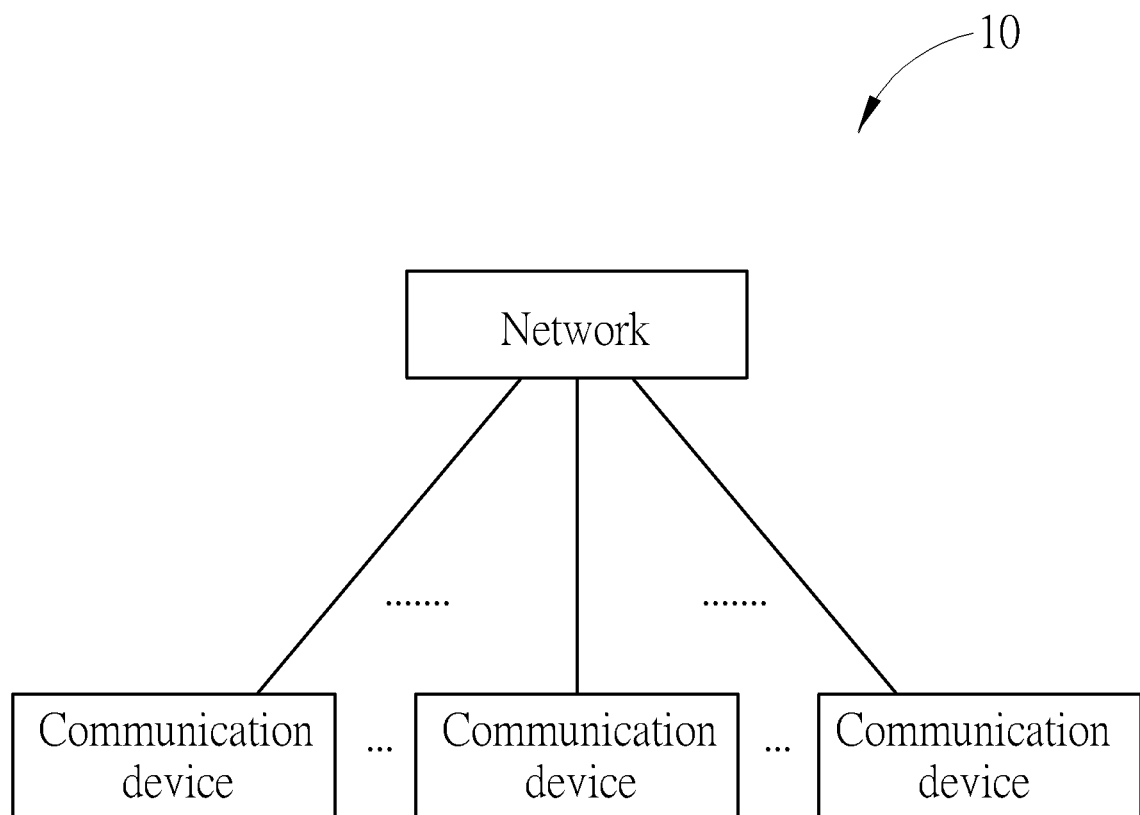
FIG. 1 is a schematic diagram of a wireless communication system according to an example of the present invention.

In FIG. 1, a wireless communication system 10 is briefly composed of a network and a plurality of communication devices. The network and a communication device may communicate with each other via one or more carriers. The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. The network may include a radio access network (RAN) and a core network. The RAN may include at least one base station (BS). In one example, the RAN may be a next generation (NG) RAN (or called 5G RAN) or an evolved NG-RAN or a sixth generation (6G) RAN. In one example, the core network may be a 5G core (5GC) network, an evolved 5GC network or a 6G core network.

A communication device may be a user equipment (UE), an internet-of-thing (IoT) device, a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
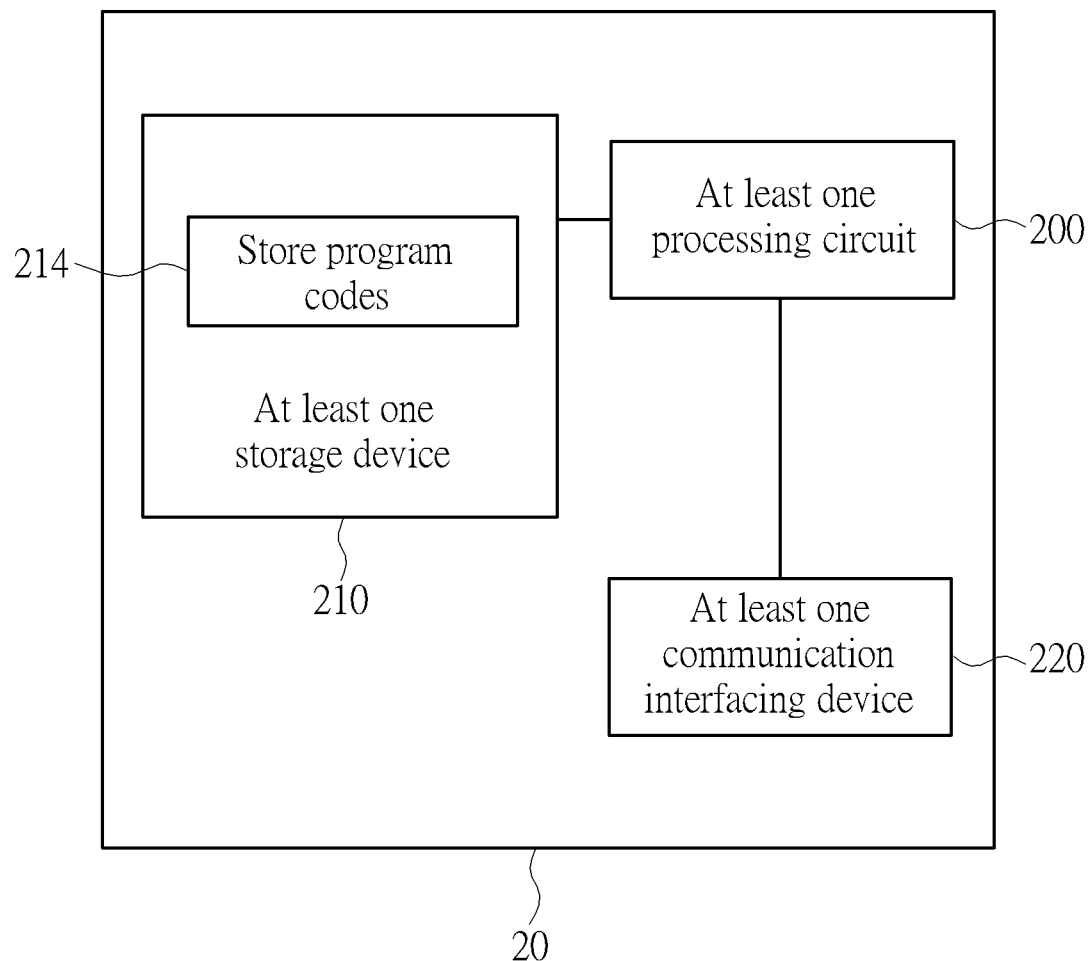
FIG. 2 is a schematic diagram of a communication device according to an example of the present invention.

In FIG. 2, a communication device 20 may be the communication device 100, the BS (s) 102 and/or 104 shown in FIG. 1, but is not limited herein. The communication device 20 includes at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the examples.

Figure 3:
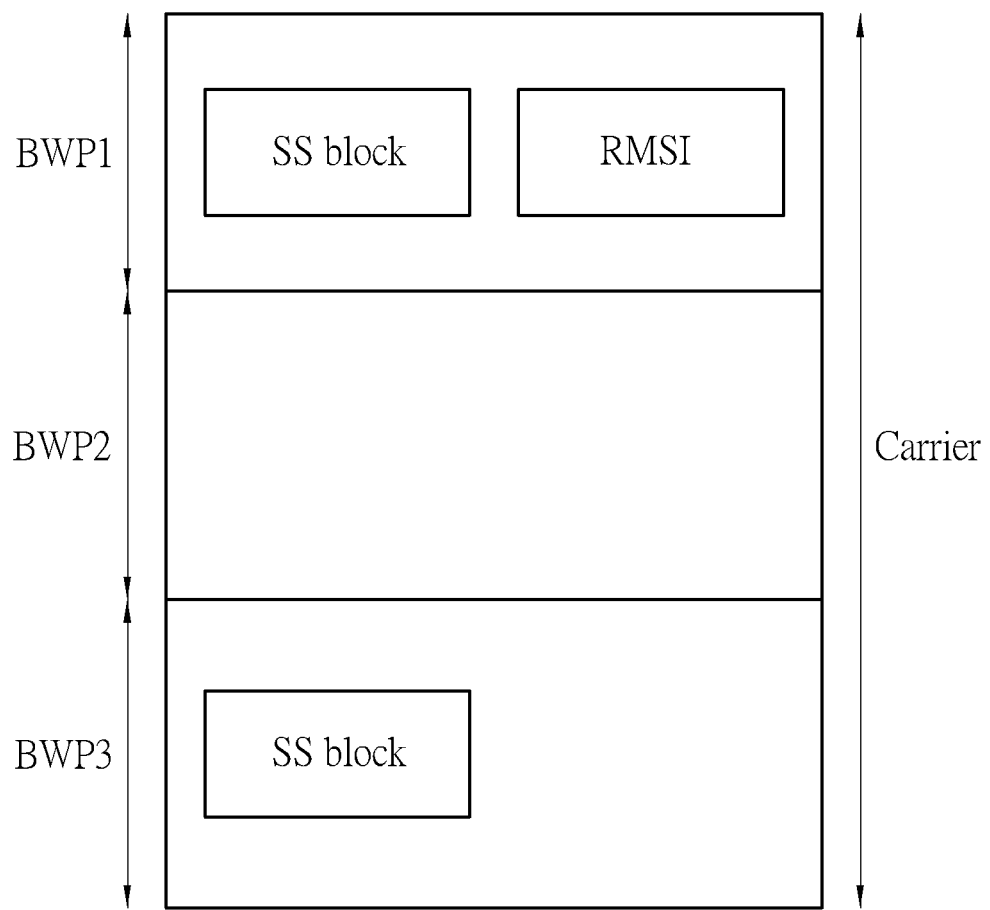
FIG. 3 is an example of BWPs according to an example of the present invention.

In FIG. 3, there are three types of BWPs belonging to a carrier (e.g., component carrier) used for a communication between a UE and a cell of a BS. The first type is explained by a BWP BWP1 which includes a synchronization signal block (SSB) and remaining system information (RMSI). The second type is explained by a BWP BWP2 which does not include the SSB and the RMSI. The third type is explained by a BWP BWP3 which includes the SSB but does not include the RMSI.

The SSB includes a primary SS (PSS), a secondary SS (SSS) and/or a physical broadcast channel (PBCH). The RMSI includes a system information block (SIB). A DL carrier has no BWP (e.g., the whole DL carrier is a BWP), or has at least two BWPs of which each BWP belongs to one of the three types. A UL carrier has no BWP (e.g., the UE is capable of transmitting on the whole bandwidth of the UL carrier), or has at least two BWPs of which each BPW is the BWP BWP2. The DL carrier and the UL carrier may be the same carrier or different carriers.

Figure 4:
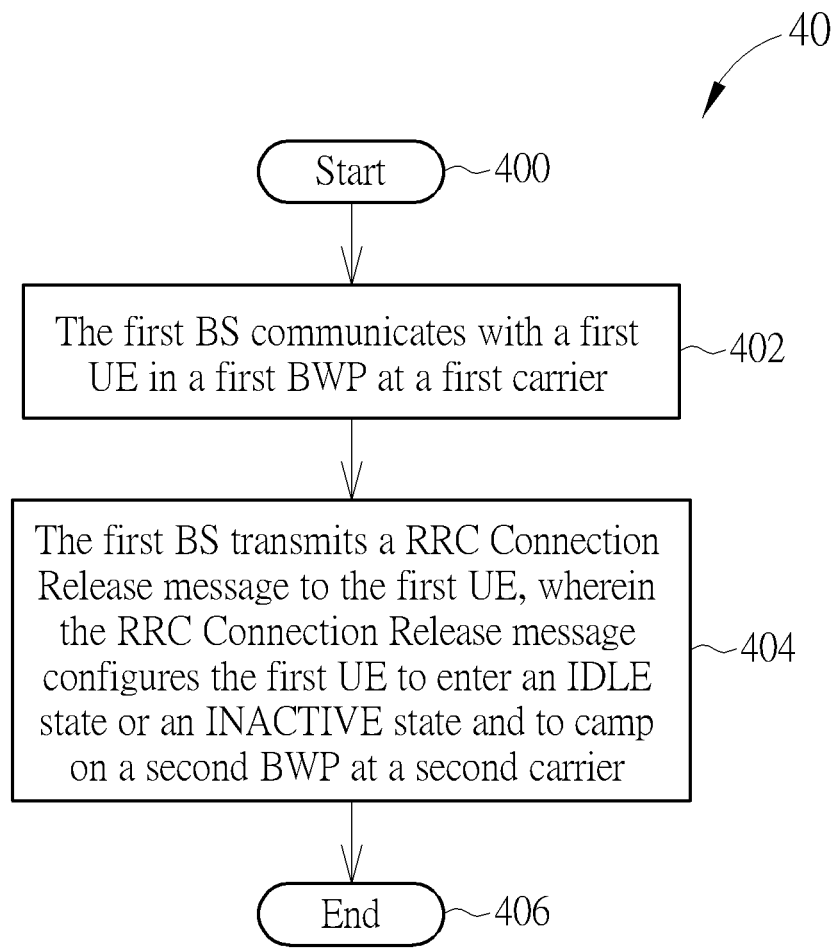
FIG. 4 is a flowchart of a process according to an example of the present invention.

A process 40 in FIG. 4 is utilized in a first BS (e.g., in the network in FIG. 1), and includes the following steps:

Step 400: Start.

Step 402: The first BS communicates with a first UE in a first BWP at (e.g., within) a first carrier.

Step 404: The first BS transmits a radio resource control (RRC) Connection Release message to the first UE, wherein the RRC Connection Release message configures the first UE to enter an IDLE state or an INACTIVE state and to camp on a second BWP at a second carrier.

Step 406: End.

In one example, the first BS configures a RRC connection and a data radio bearer (DRB) to communicate data associated to the RRC connection and the DRB with the first UE in the first BWP. The first carrier may include at least two BWPs, and the first BWP is one of the at least two BWPs. In one example, the first BS only transmits a control signal (e.g., Physical DL Control Channel (PDCCH)) and the data associated to the RRC connection and the DRB to the first UE in the first BWP. That is, only the first BWP used by the first BS for communications between the first UE and the first BS. In one example, the first BS transmits the data to the first UE in the first BWP, and transmits a control signal in a third BWP or a fourth BWP of the at least two BWPs at the first carrier. In one example, the first BS transmits a control signal and the data to the first UE in the first BWP and one of a third BWP or a fourth BWP of the at least two BWPs. A location (i.e., in a frequency domain) of the second BWP is different from a location of the first BWP. Locations of the at least two BWPs may or may not be overlapped.

In one example, the first BS receives first UE capabilities (e.g., in UE-NR-Capability) from the first UE, a second BS or a core network node (e.g., Access and Mobility Management function (AMF) or Mobility Management Entity (MME)). The first UE capabilities may indicate (e.g., include) a first maximum transmission bandwidth (TX_BW) and a first maximum reception bandwidth (R_BW) for a first frequency band belonging to the first carrier. The first maximum TX_BW may be equal to or smaller than the first maximum RX_BW.

In one example, the first maximum RX_BW indicates a maximum RX_BW on which the UE is capable of performing a reception. In one example, the first maximum TX_BW indicates a maximum TX_BW on which the UE is capable of performing a transmission. The first maximum TX_BW is greater than or equal to a first TX_BW (i.e., a bandwidth where a UL transmission spans is smaller than or equal to the first TX_BW) configured by the first BS to the UE. The first BS configures or schedules any transmission from the UE within the first TX_BW. A bandwidth of the first/second BWP is smaller than or equal to the first maximum RX_BW.

In one example, the first carrier is identified by a first Absolute Radio Frequency Channel Number (ARFCN), and the second carrier is identified by a second ARFCN. The first carrier may be same as the second carrier, and the first ARFCN is same as the second ARFCN. The first carrier may be different from the second carrier, and the first ARFCN is different from the second ARFCN. In one example, the RRC Connection Release message may or may not include the second ARFCN. The RRC Connection Release message may include BWP information/configuration. In one example, the BWP information/configuration indicates a location of the RX_BW identifying the second BWP. The BWP information/configuration indicates a RX_BW of the second BWP.

In one example, when the RRC Connection Release message does not include the second ARFCN but includes the BWP information/configuration, the first UE selects a cell in a BWP at the first carrier to camp on. The BWP is different from the first BWP.

In one example, if the first UE fails to find any suitable cell on the second BWP at the second carrier configured in the RRC Connection Release message, the first UE searches any suitable cell in a BWP at any carrier different from the second carrier configured in the RRC Connection Release message.

In one example, the first BS obtains (e.g., determines) which BWP configured to a UE in the RRC Connection Release message according to a maximum RX_BW of the UE and/or distributing (e.g., allocating) UEs in BWPs of a carrier. The first BS may communicate with a second UE in the first BWP at the first carrier. The first BS transmits a RRC Connection Release message to the second UE, wherein the RRC Connection Release message configures the second UE to enter an IDLE state or an INACTIVE state and to camp on a fifth BWP at a second carrier. A location of the fifth BWP is different from a location of the first BWP and the second BWP.

In one example, the first BS determines which BWP configured to a UE in the RRC Connection Release message according to characteristic(s) of a BWP. The characteristic(s) includes at least one of a subcarrier spacing of the BWP, a bandwidth of the BWP, SSBs broadcasted and essential SIB(s) broadcasted. The essential SIB(s) includes a SIB type 1 (SIB1) and/or a SIB type 2 (SIB2). For example, the first BS determines to configure the second BWP in the RRC Connection Release message, considering/when SSBs and essential SIB(s) are broadcasted in the second BWP (e.g., while the SSBs and/or the essential SIB (s) is/are not broadcasted in the first BWP). For example, the first BS determines to configure the second BWP in the RRC Connection Release message, considering/when the second BWP has a subcarrier spacing and/or a bandwidth smaller than that of the first BWP. The BWP information/configuration may include the characteristic(s). For example, the BWP information/configuration indicates the subcarrier spacing or indicates location of the SSBs and/or the essential SIB(s).

Figure 5:
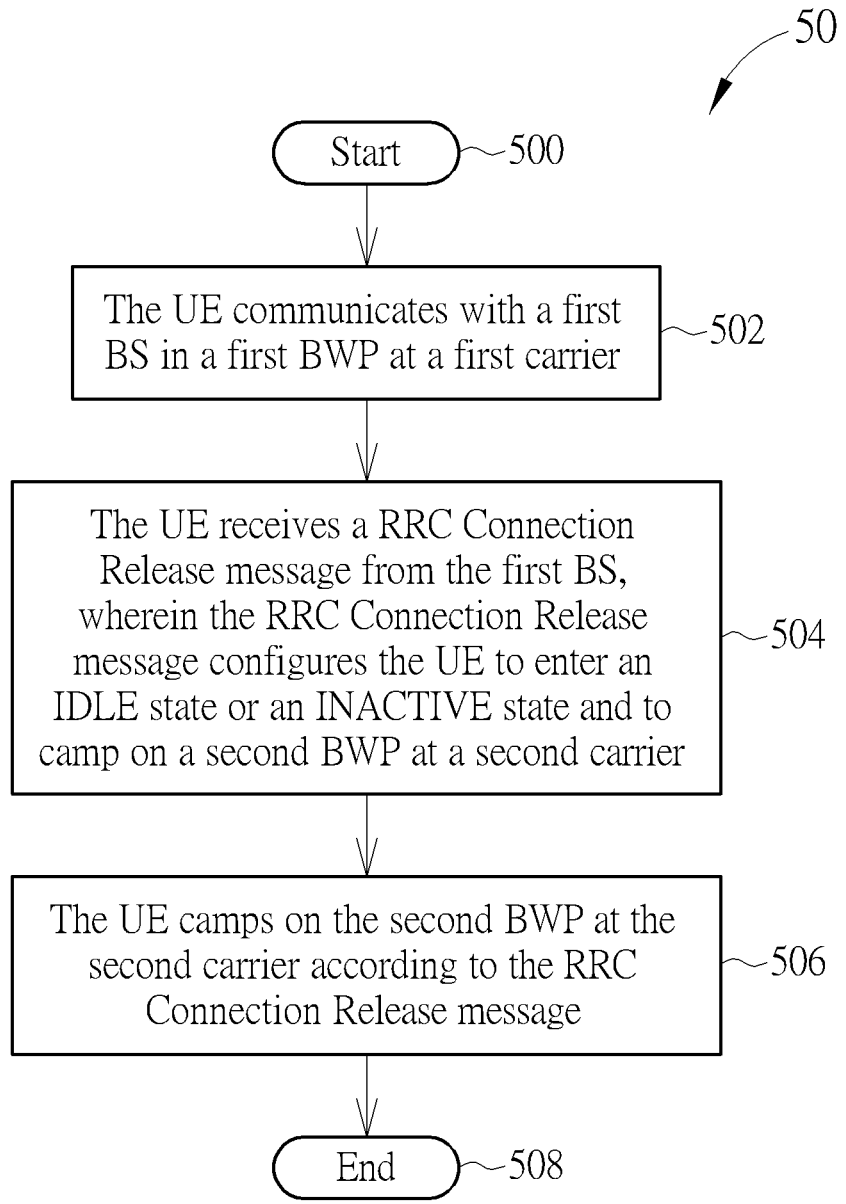
FIG. 5 is a flowchart of a process according to an example of the present invention.

A process 50 in FIG. 5 is utilized in a UE, and includes the following steps:

Step 500: Start.

Step 502: The UE communicates with a first BS in a first BWP at (e.g., within) a first carrier.

Step 504: The UE receives a RRC Connection Release message from the first BS, wherein the RRC Connection Release message configures the UE to enter an IDLE state or an INACTIVE state and to camp on a second BWP at a second carrier.

Step 506: The UE camps on the second BWP at the second carrier according to the RRC Connection Release message.

Step 508: End.

According to the process 50, the UE selects a cell on the second BWP. The description for the process 40 may be applied to the process 50.

Figure 6:
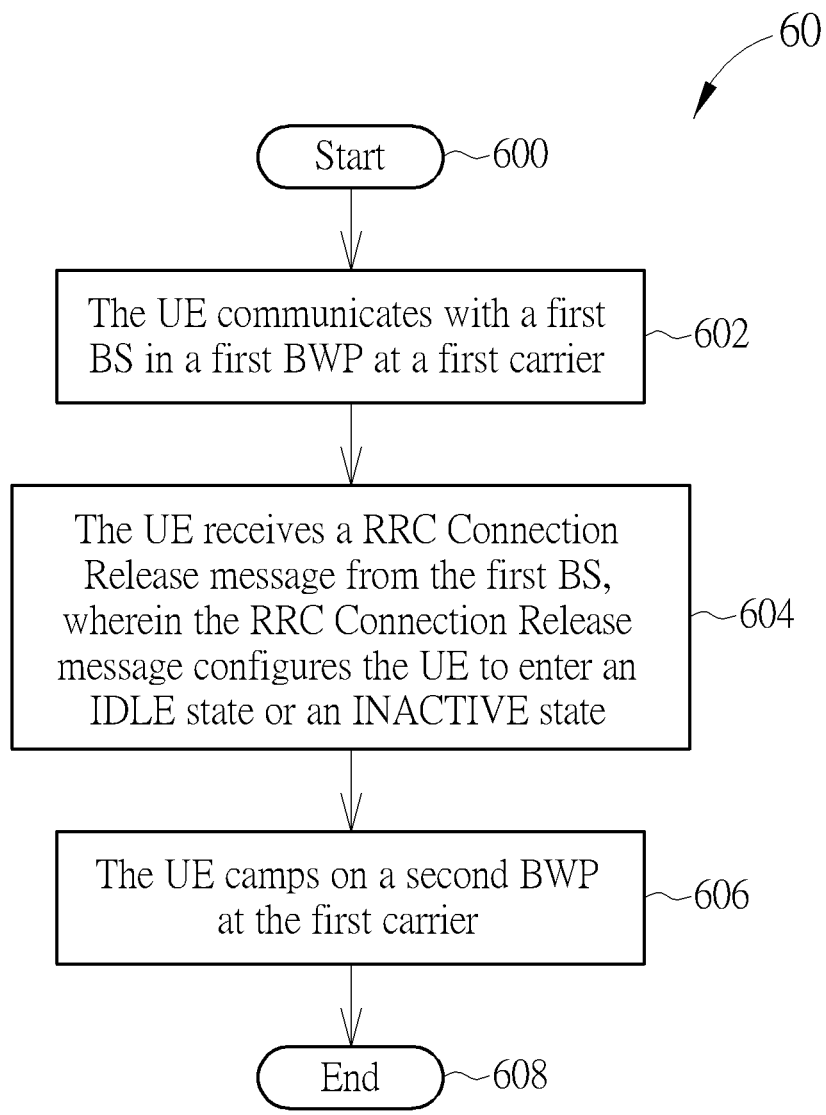
FIG. 6 is a flowchart of a process according to an example of the present invention.

A process 60 in FIG. 6 is utilized in a UE, and includes the following steps:

Step 600: Start.

Step 602: The UE communicates with a first BS in a first BWP at (e.g., within) a first carrier.

Step 604: The UE receives a RRC Connection Release message from the first BS, wherein the RRC Connection Release message configures the UE to enter an IDLE state or an INACTIVE state.

Step 606: The UE camps on a second BWP at the first carrier.

Step 608: End.

According to the process 60, the UE selects a cell on the second BWP. In one example, the RRC Connection Release message configures neither a carrier nor a BWP. That is, the RRC Connection Release message may not include carrier information/configuration (e.g., ARFCN) and BWP information/configuration. The UE may determine to select the cell in the second BWP at the first carrier. In one example, the UE determines to select the second BWP instead of the first BWP, when SSB(s) is broadcasted in the second BWP and no SSB is broadcasted in the first BWP. In one example, the UE determines to select the second BWP instead of the first BWP, when SSBs and essential SIB(s) (e.g., SIB 1 and/or SIB2) are broadcasted in the second BWP and no essential SIB or no SSB is broadcasted in the first BWP. In one example, the UE determines to select the second BWP instead of the first BWP according to its stored configuration. For example, the UE receives the stored configuration in a SIB. For example, the UE receives the stored configuration in a dedicated message (e.g., RRC message, Open Mobile Alliance (OMA) message, Bearer Independent Protocol (BIP) message or Non Access Stratum (NAS) message).

Description for the processes 40 and 50 may be applied to the process 60. Examples described for the process 60 may be applied to the processes 40-50.

The following examples may be applied to the processes 40-60.

In one example, the UE communicates with the first BS via the cell in the first BWP at the first carrier or via another cell in the second BWP at the first carrier.

In one example, the UE in the IDLE state camps on a cell of the first BS in the second BWP at the first carrier. Then, the UE performs a RRC procedure (e.g., RRC connection establishment procedure) via the cell of the first BS in the second BWP at the first carrier, to enter a CONNECTED state from the IDLE state. The UE performs a RRC connection reconfiguration procedure (initiated by the first BS) with the first BS via the cell of the first BS in the second BWP at the first carrier. The first BS transmits a RRC Connection Reconfiguration message of the RRC connection reconfiguration procedure in the second BWP to the UE, wherein the RRC Connection Reconfiguration message configures the UE to communicate with the first BS in the first BWP at the first carrier. The first BS performs Step 402 according to the RRC Connection Reconfiguration message. The UE performs Step 502 or Step 602 in response to/according to the RRC Connection Reconfiguration message. The UE may transmit a RRC Connection Reconfiguration Complete message in response to the RRC Connection Reconfiguration message in the first BWP at the first carrier, the second BWP at the first carrier, or a sixth BWP at a third carrier. In one example, the first carrier and the third carrier are TDD carriers. In one example, the first carrier is a FDD carrier for a DL, and the third carrier is a FDD carrier for a UL. A bandwidth of the sixth BWP is not greater than the maximum TX_BW of the UE.

In one example, the UE in the INACTIVE state camps on a cell of the first BS in the second BWP at the first carrier. Then, the UE performs a RRC procedure (e.g., RRC connection resume procedure) via the cell of the first BS in the second BWP at the first carrier, to enter the CONNECTED state from the INACTIVE state. When the UE receives a RRC message of the RRC procedure from the first BS in the second BWP, the UE may resume communicating with the first BS in the first BWP.

In one example, when the UE communicates with the first BS in the first BWP at the first carrier, the UE may receive Physical DL Shared Channel (PDSCH) transmissions from the first BS in the first BWP at the first carrier. Each of the PDSCH transmissions may include a Medium Access Control (MAC) protocol data unit (PDU). In one example, the UE transmits Physical UL Shared Channel (PUSCH) transmissions to the first BS in the first BWP at the first carrier or in a seventh BWP at a fourth carrier. Each of the PUSCH transmissions may include a MAC PDU. In one example, the first carrier and the seventh carrier are TDD carriers. In one example, the first carrier is a FDD carrier for a DL, and the fourth carrier is a FDD carrier for a UL. The fourth carrier may be same as or different from the third carrier. The seventh BWP may be same as or different from the sixth BWP. A bandwidth of the seventh BWP is not larger than the maximum TX_BW of the UE.

In one example, a RX_BW of a BWP may be represented by the number of physical resource blocks (PRBs). A location of a BWP may be indicated by location(s) of the PRBs. For example, BWP information/configuration may include information indicating a starting PRB of the BWP, an end PRB of the BWP or a center PRB of the BWP, to indicate the location of the BWP. For example, BWP information/configuration may include a starting PRB number identifying the starting PRB and the number of PRBs, to indicate the location of the BWP.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes 40-60 may be compiled into the program codes 214.

To sum up, the present invention provides a method and related communication device for handling a RRC connection. The communication device knows how to camp on a proper BPW at a carrier according to a received RRC message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a radio resource control (RRC) connection, comprising:
   at least one storage device; and
   at least one processing circuit, coupled to the at least one storage device, wherein the at least one storage device stores, and the at least one processing circuit is configured to execute instructions of:
   communicating with a base station (BS) in a first bandwidth part (BWP) at a first carrier;
   receiving a RRC Connection Release message from the BS, wherein the RRC Connection Release message configures the communication device to enter an IDLE state or an INACTIVE state; and
   camping on a second BWP at the first carrier;
   wherein the communication device determines to select the second BWP instead of the first BWP, when a synchronization signal block (SSB) and an essential system information block (SIB) are broadcasted in the second BWP and no essential SIB or no SSB is broadcasted in the first BWP.

2. The communication device of claim 1, wherein the RRC Connection Release message does not configures a carrier and a BWP to the communication device.

3. The communication device of claim 1, wherein the communication device selects the cell in the second BWP at the first carrier according to a stored configuration in the communication device; and the stored configuration is received in a system information block (SIB), or is received in a dedicated message.

4. The communication device of claim 1, wherein the instructions further comprise:
   camping on the cell in the second BWP at the first carrier, when the communication device is in the IDLE state; and
   performing a RRC procedure via the cell in the second BWP at the first carrier, to enter a CONNECTED state from the IDLE state.

5. A communication device for handling a radio resource control (RRC) connection, comprising:
   at least one storage device; and
   at least one processing circuit, coupled to the at least one storage device, wherein the at least one storage device stores, and the at least one processing circuit is configured to execute instructions of:
   communicating with a first BS in a first bandwidth part (BWP) at a first carrier;
   receiving a RRC Connection Release message from the first BS, wherein the RRC Connection Release message configures the communication device to enter an IDLE state or an INACTIVE state and to camp on a second BWP at a second carrier; and
   camping on the second BWP at the second carrier according to the RRC Connection Release message;
   wherein a synchronization signal block (SSB) and an essential system information block (SIB) are broadcasted in the second BWP, and no SSB or no essential SIB is broadcasted in the first BWP.

* * * * *